United States Patent

[11] 3,586,970

| [72] | Inventors | William H. Conway<br>2553 Angel Crest Drive;<br>Philip J. Caruso, Jr., 15611 Del Prado<br>Drive, both of Hacienda Heights, Calif.<br>91745 |
|---|---|---|
| [21] | Appl. No. | 787,338 |
| [22] | Filed | Dec. 27, 1968 |
| [45] | Patented | June 22, 1971 |

[54] HOT GAS TEMPERATURE SENSOR
3 Claims, 5 Drawing Figs.
[52] U.S. Cl. ............................................ 324/58.5,
    73/355, 343/100
[51] Int. Cl. ............................................. G01r 27/04
[50] Field of Search ............................................ 324/58,
    58.5; 73/355; 343/100

[56] References Cited
UNITED STATES PATENTS

| 2,792,548 | 5/1957 | Hershberger | 324/58.5 |
| 3,325,644 | 6/1967 | Frye | 73/355 |
| 3,446,074 | 5/1969 | Thomas | 73/355 |

Primary Examiner—Michael J. Lynch
Attorney—Jessup & Beecher

ABSTRACT: The invention provides an improved heat sensor which is capable, for example, of measuring extremely high temperatures of gaseous mixtures used in gas turbines, and the like. The system of the invention incorporates a microwave radiometer operating in conjunction with an "antenna," the antenna being in the form of a probe inserted into a cavity resonator through which the hot gaseous mixture passes.

INVENTORS
William H. Conway
Philip J. Caruso, Jr.

HOT GAS TEMPERATURE SENSOR

BACKGROUND OF THE INVENTION

The measurement of elevated temperatures of a gas or gaseous mixture has presented a problem in the past. To serve any useful purpose, such a measurement must fulfill the criteria of high accuracy, fast response time, and long sensor life, all coupled with a reasonably low overall cost.

A basic method for measuring gas temperatures, and one used almost universally in the prior art, involves a thermocouple sensor which is inserted directly into the gas whose temperature is to be measured. This type of sensor is accurate and is relatively inexpensive. However, its long response time makes it unsuited for many applications, and especially those involving thermostatic control. The thermocouple type of sensor also has a limited life, and any attempt to reduce the mass of the element in order to decrease the response time, also serves to shorten further the already limited lifetime.

Another type of direct measurement sensor involves a thermistor element, that is, temperature-sensitive elements including semiconductors, which exhibit varying resistance with changes in temperature. Thermistors, for the most part, exhibit the same characteristics as thermocouples, insofar as response time and operational life are concerned. Moreover, the thermistor and the thermocouple both deteriorate rapidly at excessively high temperatures of the gas.

Indirect gas temperature measurements have also been made in the past. One of the newer types of indirect gas temperature measurement device, for example, measures the infrared radiation given off by the gas. Such a device has proven to be highly accurate, and it exhibits a fast response time, and it is potentially capable of having a relatively long lifetime.

Optical radiation pyrometers have also been used for indirect gas temperature measurements. However, the infrared and optical pyrometers usually contain lenses, mirrors, windows and the like, which focus and transmit the radiations from the region whose temperature is being measured. When such devices are used, for example, in conjunction with an atmosphere filled with vapors, gases, smoke, and the like, the windows, lenses, and mirrors of the pyrometer tend to become fouled or coated with condensates or deposits which change the readings and increase the error of the pyrometer and even tend to render the device inoperable. Costly and complex mechanisms are then required to maintain the optical path between the hot gas and the sensor in a satisfactory condition in order that the desired measurements may be made with any degree of precision.

Fluidic systems have also been proposed as temperature sensors. Such sensors are potentially low in cost and capable of long operational life. However, the accuracy of such sensors becomes degraded at elevated temperatures; and response time is also a problem.

A particular problem area is in the field of gas turbines in which high temperature gas mixtures are used as a drive medium. It is essential in such turbines that the actual temperature of the gas mixture be precisely controlled. However, this has not been feasible by any of the prior art control systems, due to the unavailability of an appropriate fast-response sensor for sensing the temperatures of the gases in the turbine in a precise, accurate, and reliable manner, and which will be capable of reasonably long operational periods.

The system of the present invention has particular utility in providing an appropriate sensor and temperature-measuring system for application to gas turbines. It will become evident as the description proceeds, however, that the sensor and temperature-measuring system of the invention has general utility in the measurement of the temperature of high temperature gas mixtures in any type of environment.

The aforesaid temperature measurements are made by the system of the invention by causing the gas mixture whose temperature is to be measured to pass through a resonant cavity, and to couple the antenna of the microwave radiometer into the cavity, the radiometer being tuned to a selected frequency at which the power level of the microwave signals in the cavity, as intercepted by the antenna, is a measure of the temperature of the gas mixture. The measurement of the microwave radiation emitted from either the gas itself, or from an intermediate material heated by the gas, is the basis of the system of the invention. Microwave radiation measurement offers the potential of coupling high accuracy and fast-response times with extremely long sensor lifetimes. Moreover, the entire measurement system can be constructed at a relatively low cost.

It is well known that practically all materials exhibit some form of spectroscopic absorption at various frequencies in the electromagnetic spectrum, and that such materials exhibit "absorption lines" at the particular frequencies. These absorption lines are distributed from the visible light region of the electromagnetic spectrum through the infrared region and into the microwave region. The system of the present invention is concerned with the absorption lines, or "resonances" of the particular gas or gaseous mixture which occur in the microwave part of the spectrum. These latter resonances are primarily associated with molecules which have magnetic or electric dipole moments.

In order for any gas system to be thermodynamically stable, it is a prerequisite that the amount of energy absorbed at any frequency must be equal to the energy radiated at that frequency. It follows, therefore, that at any frequency where a gas exhibits a resonant absorption line, a resonant radiation must also exist in order to achieve the aforesaid thermodynamic balance. When a gas is considered which is a mixture of many individual constituents, it is apparent that a large number of frequencies exist throughout the electromagnetic spectrum and in the microwave portion thereof where energy is absorbed and therefore radiated by the gas mixture.

It is also known to the gas spectroscopy art that as the pressure of the gas, or gas mixture, is increased the absorption lines become broader, indicating an increased band width for each of the spectroscopic resonances. This line width variation can change from an infinitesimally narrow line at extremely low pressure to a relatively broad line at atmospheric pressure. For the relatively high pressures of the gas, or gas mixture, an almost constant absorption, and concomitant radiation, is experienced throughout the spectrum.

In the practice of the present invention, and as mentioned above, the gas, or gas mixture, whose temperature is to be measured is passed through a microwave cavity resonator. Such a resonator is characterized by a bounded electromagnetic field enclosed almost entirely by a metallic wall. The cavity resonator may have any desired shape.

As is well known, the magnetic and electric energies stored in the cavity resonator determine its equivalent inductance and capacitance values. The equivalent resistance of the cavity resonator, on the other hand, is determined by the energy dissipated. When the frequency of the electromagnetic field approaches one of the resonance frequencies of the cavity resonator, the inductive and capacitive reactances balance out, and the equivalent circuit becomes resistive in nature. A characteristic of the cavity resonator is the large number of different frequencies at which it exhibits resonance characteristics.

It is well known that all bodies whose temperature is above absolute zero radiate energy throughout the electromagnetic spectrum. Although most of this energy is concentrated in the infrared and visible part of the spectrum, some of the energy is radiated in the microwave portion of the spectrum which may be considered as that portion extending between approximately 10 GHz. and 300 GHz. The present invention is concerned with the radiations in the microwave part of the spectrum.

The amount of energy available in the microwave portion of the spectrum for any particular body is proportional to Boltzman's Constant multiplied by its absolute temperature and the absorbed band width. Specifically:

$$P = kTB \qquad (1)$$

Where: $P$ is the power
$k$ is Boltsman's Constant
$T$ is absolute temperature
$B$ is bandwidth.

Equation (1) is based on the assumption that all of the energy incident on the body is absorbed thereby and that none is passed through the body and none is reflected by the body.

The system of the present invention applies the aforesaid concepts to a gas, or gaseous mixture, at an elevated temperature, by containing the gas in a cavity resonator having, for example, resonance characteristics matching the selected absorption frequency of the gas, and illustrating the resulting electromagnetic radiations to a microwave radiometer.

DETAILED DESCRIPTION OF THE ILLUSTRATED EMBODIMENT

Figure 1:
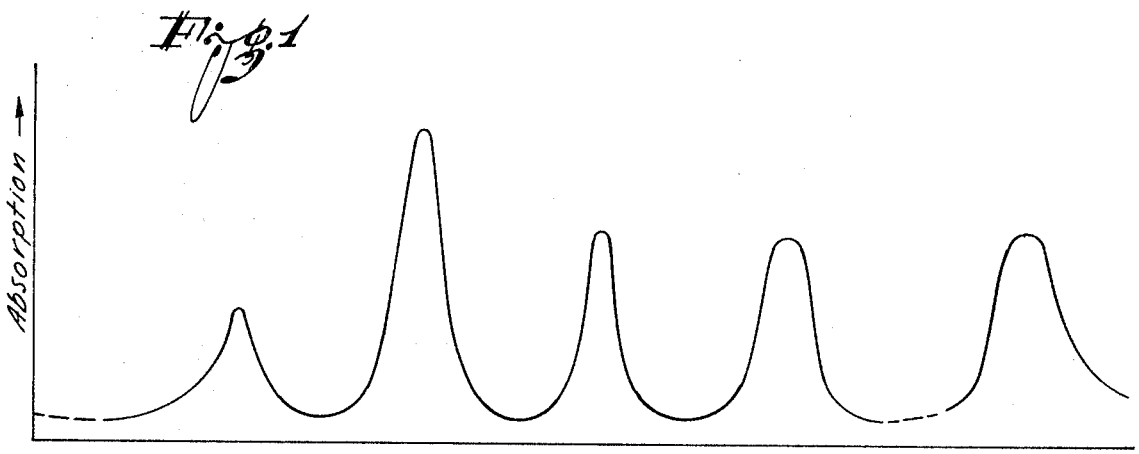
FIG. 1 is a representation of a typical absorption spectra for a hypothetical gas mixture, of the type whose temperature may be sensed and measured by the system of the present invention.

As mentioned above, a typical absorption spectra for a hypothetical gas mixture is represented by the curve of FIG. 1. This curve, for example, may represent the absorption lines which occur for the mixture in the microwave portion of the spectrum. These lines would occur, therefore, at the frequencies designated $fa_1, fa_2, fa_3, fa_4 \ldots fa_n$. As explained above, for each of these absorption lines, there is a concomitant radiation of electromagnetic energy, and this radiation is sensed and measured by the apparatus and system of the present invention.

Figure 2:
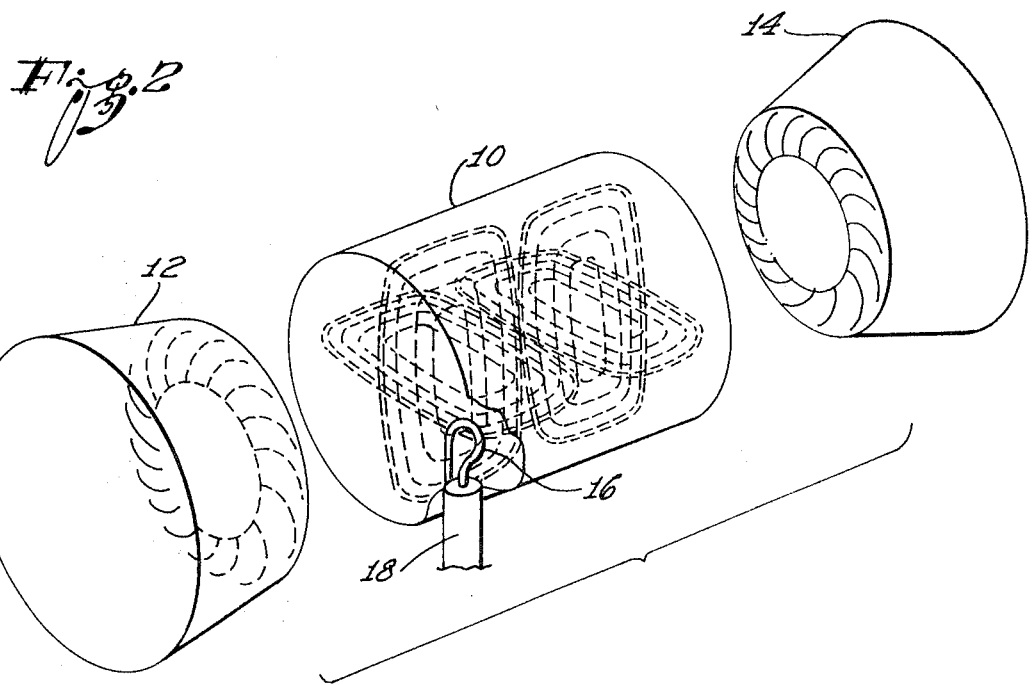
FIG. 2 is a diagrammatic representation of a gas turbine cavity resonator incorporating the concepts of the present invention, and a coupling loop for introducing the energy from the resonator to a microwave radiometer.

In the representation of FIG. 2, a cavity resonator 10 of a cylindrical configuration, for example, is interposed between the inlet 12 and outlet 14 of a gas turbine, so that the hot gaseous mixture passing through the turbine and acting as a drive means therefor also passes through the cavity resonator. The cavity resonator is constructed so that the electromagnetic field set up in it due to the gaseous mixture is almost entirely enclosed by the metallic wall. As mentioned above, the resonator may in fact have any desired shape. The distribution of the electromagnetic fields within the cavity resonator 10 are shown by the dashed lines. These fields being produced, for example, by the hot gaseous mixture passing into the cavity resonator.

A probe 16 for a microwave radiometer extends into the cavity resonator 10, and the probe is coupled through a usual coaxial line 18 to the radiometer itself.

Figure 3:
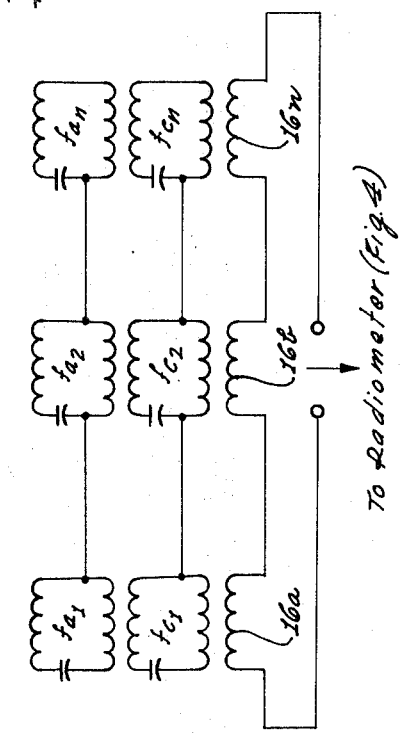
FIG. 3 is an equivalent circuit of the cavity resonator, with respect to the electromagnetic radiations of the gas mixture represented by the spectra of FIG. 1.

As shown by the equivalent circuit of FIG. 3, the various radiations set up by the gaseous mixture in the cavity resonator may be represented by the tuned circuits $fa_1, fa_2 \ldots fa_n$. The cavity resonator itself then acts as a transformer, as designated by the tuned circuits $fc_1, fc_2 \ldots fc_n$ to couple the energy to the probe 16 which is represented by the inductances $16a, 16b \ldots 16n$. The probe, in turn, applies the energy to the radiometer of FIG. 4 by way of the terminals A and B and through the coaxial cable 18 of FIG. 2.

The equivalent circuit of FIG. 3 reveals that the combination is in effect a number of transformers connected in series, with energy being transferred at any frequency for which a resonant circuit exists. Therefore, when instead of a second coupling loop the cavity resonator 10 is filled with a gas having spectroscopic absorptions occurring in the microwave frequency region, such as shown in FIG. 1, the gas will absorb energy and radiate energy at the cavity resonance frequencies. Whenever a cavity resonance frequency coincides with a gas resonance frequency a maximum transfer of energy may occur, that is, any energy existing in the cavity must be absorbed either in the walls or by the coupling. Such absorption is exhibited only over a very narrow bandwidth if the only dissipation is provided by the walls of the microwave cavity resonator. The absorption of the energy within the gas filling the cavity causes a broadening effect on the bandwidth of resonance, and it is through this broadening phenomenon, that is, the lowering of the quality factor (Q) of the cavity, that the energy transformation between the gas and the radiometer is accomplished.

It should be noted that the probe 16 may be made of the same material as the wall of the cavity, and may exist indefinitely within the environment of the hot gases within the cavity.

Figure 4:
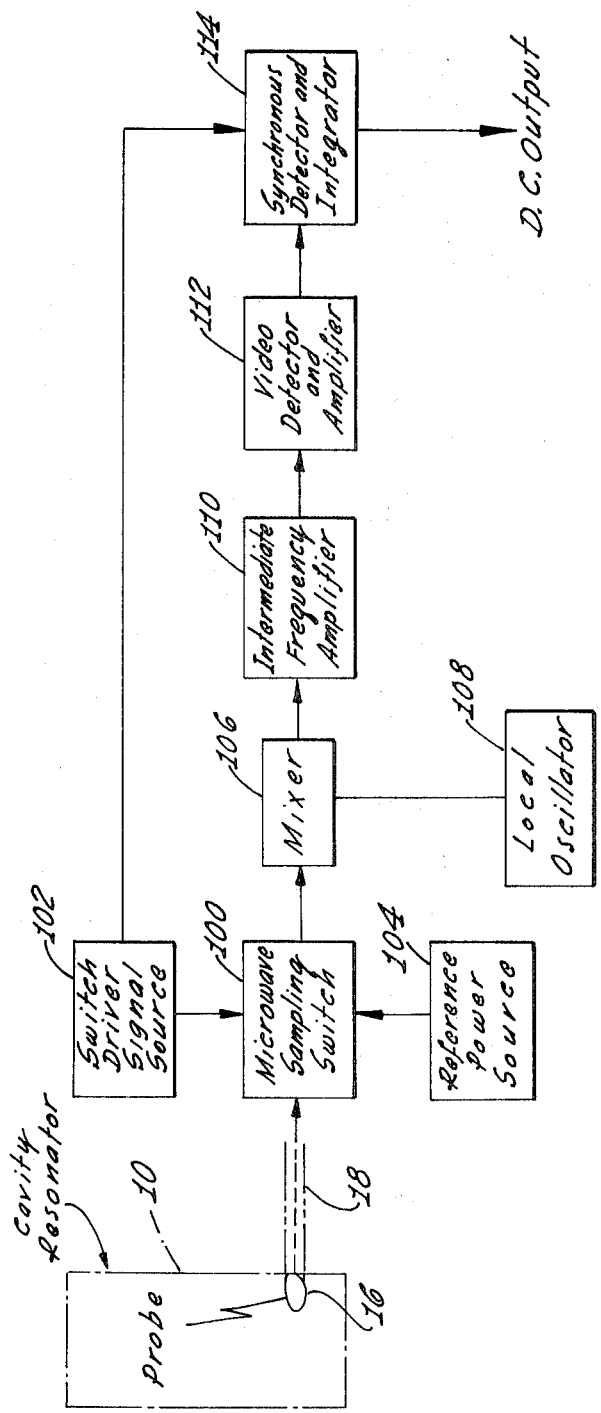
FIG. 4 is a block diagram of a microwave radiometer which may be incorporated into the system of the present invention.

The microwave radiometer, such as shown by the block diagram of FIG. 4, is an instrument designed specifically to measure the very small quantities of power emitted from the resistance terminating the line 18. In order to reduce the dynamic range requirements that must be handled by the radiometer, it is usual to switch the input between the source to be measured and a reference source at a comparable temperature. This method of operation not only reduces the dynamic range requirements, but also greatly improves the stability of the radiometer.

The resolution capability of the radiometer is defined by the following equation:

$$\Delta T = \frac{k T_{in}}{\sqrt{B\tau}} \qquad (2)$$

Where: $\kappa =$ detection constant
$T_{in} =$ input temperature (equivalent)
$B =$ bandwidth
$\tau =$ integration time.

The output of the microwave radiometer is a voltage which is proportional to the difference in temperature between the unknown temperature and the reference source temperature. The amount of power that is available from the unknown source is a linear function of the temperature of that source, since the other two factors in the power equation are constants for a given radiometer. The output of the radiometer therefore is a voltage which is proportional to the temperature of the gases in the cavity resonator 10.

In the microwave radiometer of FIG. 4, the microwave signals from the line 18 are applied to a microwave sampling switch 100. The sampling switch 100 is controlled by a switch driver signal source 103 alternately to apply the signals from the line 18 and from a reference power source 104 to a mixer 106. The mixer is connected to a local oscillator 108 whose frequency is adjusted so that the mixer will provide intermediate frequency signals for acceptance by the intermediate frequency amplifier 110 corresponding to a selected input signal frequency.

The intermediate frequency signals are then detected in the video detector portion of the block 112 and the resulting video signals are amplified and applied to a synchronous detector 114. The synchronous detector effectively subtracts signals received on the line 18 from the signals from the power source 104. The differences in these two values are averaged out in an integrator in the detector 114 to minimize noise and to increase measurement sensitivity. The resulting direct current output is a measure of the temperature of the gaseous mixture in the cavity resonator 10.

Thus, in order to measure the temperature of a gas mixture, for example, in the turbine of FIG. 2, it is first necessary to determine what gas, or gases, are to be contained within the cavity resonator 10. The microwave spectroscopic absorption frequencies of the mixture may then be determined, once the gas constituents and their concentrations are known.

As a next step, the particular cavity resonator to be used in the system is selected and its resonant modes determined. These modes are then compared with the absorption frequencies of the gas mixture so that the best operating frequency, or frequencies, for the system may be determined. Minor changes may then be made to the cavity resonator to bring its resonances into as close a match as possible with the absorption lines of the gaseous mixture. Moreover, an additional member formed of microwave absorbing material, such as designated 200 in FIG. 5, may be mounted in the cavity resonator to be heated by the gas.

When the desired operating frequency is determined, and the particular operating mode of the cavity is identified, the coupling to the microwave radiometer may be designed. This may be, for example, a loop coupling, a probe coupling, a waveguide port type, depending upon the selected operating frequency and cavity resonator characteristics.

When an appropriate coupling is made to the heated absorption mechanism through the resonant cavity, a significant amount of microwave energy will be supplied to the radiometer. The bandwidth over which the energy is distributed is determined by the bandwidth of the cavity resonator and intensity of the gas absorptions.

Figure 5:
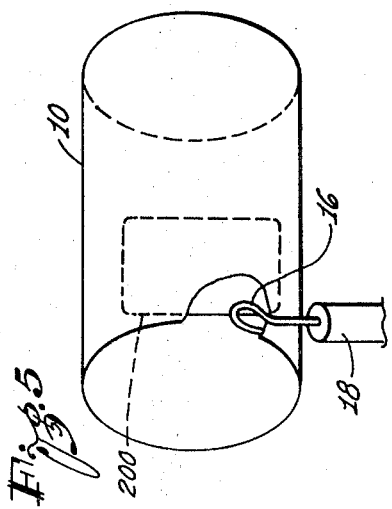
FIG. 5 is a fragmentary diagrammatic representation of a modification of the structure of FIG. 2.

When a heated intermediate absorber is used, such as shown in FIG. 5, coupling to the thermal energy in the gas can be accomplished by coupling to the heated intermediate absorber 200. In some cases, for example, when the resonant cavity is either too large or too small to have distinct resonant modes at a desired operating frequency, the microwave energy radiated by the intermediate absorber 200 may be measured as an indication of the gas temperature. The radiation from the intermediate absorber can be coupled to the radiometer, for example, by using other resonant frequencies and mode of the cavity not related to the gas absorption frequencies; or by direct radiative coupling, as shown in FIG. 5, or by direct conductive coupling. In like manner, the electromagnetic radiation from the sides of the container may be picked up by an antenna coupling or by direct connection and used in the radiometer to measure the gas temperature.

The invention provides, therefore, an improved system for providing accurate and precise temperature measurements of a gas or mixture of gases, and of achieving this in a feasible manner and with relatively simple and inexpensive equipment.

What we claim is:

1. A system for measuring the temperature of a gas mixture, or the like, including: a cavity resonator exhibiting resonance characteristics at selected frequencies in the microwave portion of the electromagnetic spectrum; means for introducing a gas mixture into said cavity resonator, said gas mixture having absorption lines at particular frequencies in the microwave portion of the electromagnetic spectrum, at least one of said absorption lines corresponding to the aforesaid resonance characteristics of said cavity resonator and said gas mixture emitting microwave radiations at such frequency, the power level of said radiations being a function of the temperature of said gas mixture; a probe extending into said cavity resonator for producing microwave signals in response to said electromagnetic radiations from said gas in said cavity resonator; a microwave radiometer electrically coupled to said probe and responsive to the microwave signals at such frequency received from said probe for producing an output representative of the temperature of said gas mixture and an intermediate absorber member formed of microwave absorbing material positioned in said container.

2. The system defined in claim 1 and which includes an electrical conductor extending into said container and electrically coupled to said absorber member for producing microwave signals; and in which said microwave radiometer is electrically coupled to said conductor and is responsive to the microwave signals from said conductor for producing an output representative of the power level of said microwave signals.

3. The system defined in claim 1, and which includes a microwave probe radiatively coupled to said absorber member for producing microwave signals in response to electromagnetic radiations therefrom; and in which said microwave radiometer is electrically coupled to said probe and is responsive to the microwave signals from said probe for producing an output representative of the power level of said microwave signals.